US012418554B1

(12) United States Patent
Saxena et al.

(10) Patent No.: US 12,418,554 B1
(45) Date of Patent: Sep. 16, 2025

(54) DEVICE POPULATION ANOMALY DETECTION

(71) Applicant: International Business Machines Corporation, Armonk, NY (US)

(72) Inventors: Rajesh Kumar Saxena, Thane West (IN); Harish Bharti, Pune (IN); Ankit Singhal, Meerut (IN); Sandeep Sukhija, Sri Ganganagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/604,768

(22) Filed: Mar. 14, 2024

(51) Int. Cl.
*H04L 9/40* (2022.01)
*H04L 41/14* (2022.01)

(52) U.S. Cl.
CPC ........ *H04L 63/1425* (2013.01); *H04L 41/145* (2013.01); *H04L 63/0823* (2013.01); *H04L 63/1441* (2013.01)

(58) Field of Classification Search
CPC .................................................. H04L 63/0823
See application file for complete search history.

(56) References Cited

U.S. PATENT DOCUMENTS

| | | | |
|---|---|---|---|
| 10,419,931 B1 | 9/2019 | Sohail et al. | |
| 11,522,879 B2 | 12/2022 | Koral et al. | |
| 2014/0283054 A1 | 9/2014 | Janjua et al. | |
| 2016/0050200 A1 | 2/2016 | Yu | |
| 2021/0160262 A1* | 5/2021 | Bynum | .................. H04L 43/04 |
| 2021/0312040 A1* | 10/2021 | Duttachoudhury | ..... G06F 21/33 |
| 2022/0294715 A1* | 9/2022 | Agrawal | ................. H04L 43/04 |
| 2023/0275918 A1* | 8/2023 | Tse | ...................... H04W 12/121 |
| | | | 726/22 |

OTHER PUBLICATIONS

Bargaje, Detect anomalies on connected devices using AWS IoT Device Defender, Sep. 14, 2018.
Bhatt et al., Attribute-Based Access Control for AWS Internet of Things and Secure Industries of the Future, Jul. 30, 2021.
Fellinge, Identify Anomalous Device Behavior Through Logging and Alerting, Nov. 9, 2018.

* cited by examiner

*Primary Examiner* — Caroline H Jahnige
(74) *Attorney, Agent, or Firm* — Garg Law Firm, PLLC; Rakesh Garg; Gavin Giraud

(57) ABSTRACT

An embodiment establishes a network model based at least in part on network data received from a network, wherein the network data comprises device data and certificate data. The embodiment samples the network to receive a network data sample. The embodiment compares the network data sample to the network model to determine whether an anomalous amount of devices is present in the network. The embodiment compares the network data sample to the network model to determine whether an anomalous amount of certificates is present in the network. The embodiment identifies a device population anomaly upon a determination that an anomalous amount of devices and/or an anomalous amount of certificates is present in the network.

20 Claims, 9 Drawing Sheets

*Fig. 6*

$\{P^i(k|k) \triangleq \partial^A(k) - \partial^j(k|k)\}_{\substack{j=B..N \\ i=A,j}}$ ⟵ 601

$E[P^i(k)] \triangleq E[\partial^A(k|k)] - E[\partial^j(k|k)] = e^\xi$ ⟵ 602

$E[P^i(k)]_{devices} \triangleq \{E[\partial^A(k|k)] - E[\partial^j(k|k)]\}_{j=2} = \xi_{device}$ ⟵ 603

$H1: \langle E[\{\xi_{device} - E[\xi_{device}]\}\{\theta_{certificates} - E[\theta_{certificates}]\}] \gg 0 \rangle$ ⟵ 604

DEVICE POPULATION ANOMALY DETECTION

BACKGROUND

The present invention relates generally to cyber security. More particularly, the present invention relates to a method, system, and computer program for device population anomaly detection.

Edge computing architecture is a type of computer architecture design that focuses on performing computing, i.e., processing data, at the closest point to which data is being received. Edge computing architecture enables processing to occur more quickly than some remote data processing architectures by reducing latency and lag caused by transmitting data over long distances for processing. Applications and programs running at the "edge" are able to respond to user interaction and incoming data more quickly and efficiently, thereby resulting a more responsive user experience as well as an increase in computational performance. In an edge computing architecture configuration, information may be collected at devices and/or sensor systems that possess enough bandwidth, memory, processing ability and functionality, to collect, process, and execute upon data in real-time with little to no help from other parts of the network. There is, however, some kind of connectivity with the network that enables communication between the device and a database at a centralized location.

Edge computing architecture is a distributed computing architecture that encompasses all the components active in edge computing, including but not limited to, devices, sensors, servers, clouds, etc., where data is processed and/or used at the far reaches of a network. In a multi-layer edge architecture, a cloud storage or other central storage location may still be incorporated as a layer in the mule-layer edge computing architecture. Edge computing encompasses an ecosystem of infrastructure components that may be dispersed from the central location of an enterprise's datacenter outwardly, across all edge locations. The components may include, but are not limited to, compute and storage components, connectivity components, applications, devices, sensors, etc.

SUMMARY

The illustrative embodiments provide for network device population anomaly detection. An embodiment includes establishing a network model based at least in part on network data received from a network, wherein the network data comprises device data and certificate data. The embodiment also includes sampling the network to receive a network data sample. The embodiment also includes comparing the network data sample to the network model to determine whether an anomalous amount of devices is present in the network. The embodiment also includes comparing the network data sample to the network model to determine whether an anomalous amount of certificates is present in the network. The embodiment also includes detecting a device population anomaly upon a determination that an anomalous amount of devices and/or an anomalous amount of certificates is present in the network. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts a plurality of example formulas related anomalous device population detection in accordance with an illustrative embodiment;

DETAILED DESCRIPTION

Figure 1:
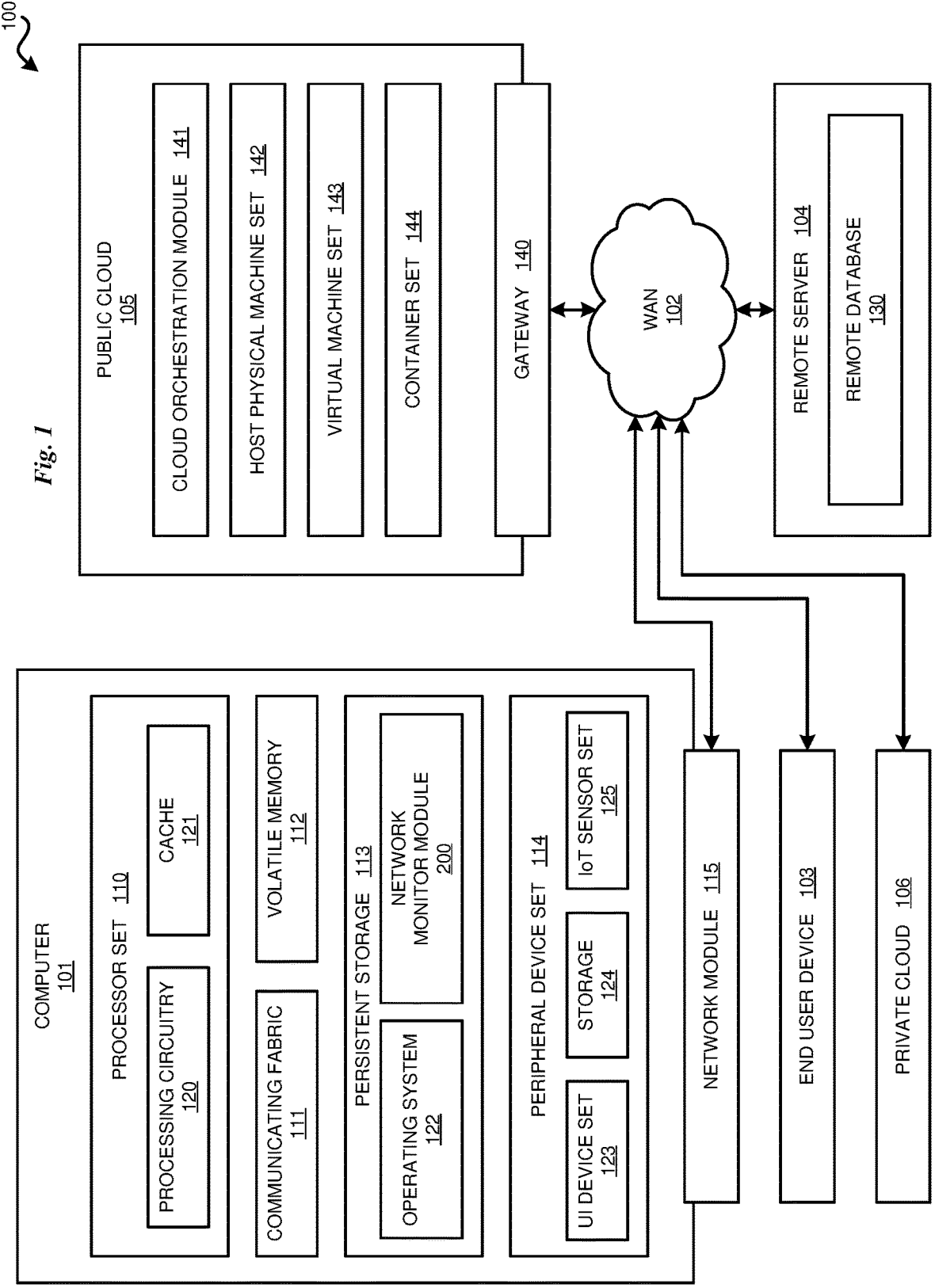
FIG. 1 depicts a block diagram of a computing environment in accordance with an illustrative embodiment.

In a network environment, device authentication is a means to ensure that only authorized devices can access network resources and communicate across a network securely. One method for authenticating devices is through the use of digital certificates. A Certificate Authority (i.e., a trusted entity responsible for issuing and managing digital certificates) may verify the identity of a device or entity requesting a certificate before issuing the certificate to the device or entity. When a device joins a network, the device may undergo an enrollment process to obtain a digital certificate. During enrollment, the device may generate a key pair comprising a public and a private key. The private key may be kept secure on the device, while the public key may be shared. The device may send a certificate signing request to the Certificate Authority that may include the device's public key and information about the device (e.g., device identity, purpose, etc.).

The Certificate Authority may review the certificate signing request and issue a digital certificate upon a determination that the device has requisite authorization to join the network. The digital certificate binds the device's identity to the device's public key. The newly issued certificate is securely delivered to the requesting device, which may be accomplished through various means, such as for example, a secure download or direct provisioning, and the device stores the digital certificate securely. The certificate may include information about the device, the Certification Authority's digital signature, and the device's public key.

Whenever the device attempts to connect to the network or access a resource over the network, the device presents the device's corresponding digital certificate to the network. The network verifies the authenticity of the certificate by checking the digital signature using the Certificate Authority's public key, which has been previously trusted and distributed. If the verification is successful, the device is authenticated and granted access to the network.

Depending on the specific configuration of the network, a digital certificate may have a predetermined validity period. In certain scenarios, the device may request a certificate renewal prior to expiration of the previously issued certificate, and the Certification Authority may issue a new certificate. By implementing this certificate-based authentication system, networks can ensure that only authorized and trusted devices gain access, thereby enhancing overall security and preventing unauthorized access or malicious activities.

An edge-based network typically includes multiple devices, and each device will correspond to a separate certificate utilized to authenticate the device with a centralized hub. In scenarios where the number of devices is limited, a limited number of certificates may suffice, and any change in the number of devices or corresponding certificates may be detected manually. However, in scenarios where the number of devices and/or the certificates increases to a very large number or exponentially (for example in case of IoT devices), detection of an unexpected device becomes increasingly complex and difficult. Accordingly, it may be prohibitively computationally expensive or even impossible to detect an unexpected device that is either trying to connect or is already connected to other devices and/or components of the edge-based network, and/or the central hub of the network. Further, scenarios also exist where a physical device and the corresponding certificate to the device is stolen or is being used by an unauthorized party, and one or more unauthorized devices are connected to the edge-based network or centralized hub using the stolen certificate by an unauthorized party.

Further, anomaly detection becomes more difficult in scenarios where a network is designed to allow the use of the same certificate for multiple devices, instead of one certificate per device, which may be due to cost, certificate management, based on geographic location, customers, or various other reasons. Thus, there exists a need for a technical solution to solve the technical problem of detecting anomalies device population of a network, wherein the technical solution may be based at least in part on monitoring a relationship between devices and certificates in the network.

Many centralized hubs today provide the capability to raise alarms or alerts when a new device is connected to the network or to the centralized hub, or a new certificate is used by a device. However, the existing solutions provided by centralized hubs are not capable of detecting whether a newly connected device is a legitimate device or a fraudster device. Further, it is also possible that there exists a latency between a device connection and detection of the device. Further, since the increase in devices and certificates is a normal, exponential, and on-going process, some alerts might go unnoticed or might be acknowledged with a delay, which also poses a security risk. Further, since the number of devices and certificates may not be same in a network, a one-to-one correlation between devices and certificates might not be reliable. Embodiments of the present disclosure address the deficiencies described above through a method and framework that establishes a relation between the number of devices and the number of certificates, including the ever-increasing population of each, so that anomalies can be more efficiently readily detected.

Embodiments of the present disclosure include a method for analysis of different aspects of devices and certificates via a network model. Embodiments of the present disclosure include iteratively utilizing the network model to evaluate each instance of increase of each set of dimensions pertaining to devices, incidental idle states, executed certificates or their implied changes. Further, embodiments of the present disclosure include a method that considers individual metric sensitivity changes over a given time epoch to deduce anomalies in device population.

Embodiments of the present disclosure include establishment of an error data sink that is configured to accumulate representational error corresponding to a network model by decoupling the devices within the network model. Embodiments of the present disclosure provide insights into representational error of a network model using time variant expected values of device and certificates that considers reconciliatory imbalances. Further, embodiments of the present disclosure provide hypothesis-based insights for determination of whether a device population is Byzantine or anomalous in nature.

As used throughout the present disclosure, the term "device data" refers to any data related to one or more devices in communication with a network. In an embodiment, device data includes device population data, including data related to the device population of devices of a network. An example of device data may include, but is not limited to, a number of registered devices, a number of connected devices, a number of idle devices, a number of suspended devices, a number of de-provisioned devices, and/or any other data related to characteristics to a device population of a network. Further, device data may further include data related to one or more individual devices of a network, including but not limited to, device performance data, device throughput data, device connectivity data, and any other data related to a device.

As used throughout the present disclosure, the term "certificate data" refers to any data related to one or more digital certificates corresponding to device(s) of a network. An example of certificate data may include, but is not limited to, a number of validated certificates, a number of revoked certificates, a number of created certificates, a number of renewed certificates, and/or any other data related to characteristics of digital certificates. Further, certificate data may include data related to one or more individual digital certificates, including but not limited to, certificate creation data, certificate history, and any other data related to a digital certificate.

As used throughout the present disclosure, the term "network model" refers to a computer model representative of an actual or hypothetical network. In an embodiment, the network model represents particular characteristics of a network. In an embodiment, the network model represents a relationship between network devices and digital certificates over time. In an embodiment, the network model is configured to determine the rate of growth or decay of network devices and/or digital certificates based on historical device data and/or historical certificate data. For example, based at least in part on device data and/or certificate data at one or more previous moments in time, the network model may be configured to predict an expected amount of devices and/or certificates at a current or future moment in time. In an embodiment, the network model includes a multi-layer model, such that each layer of the model represents a relationship between device data and certificate data at a particular moment in time.

The illustrative embodiments provide for automated detection of device population anomalies in a network environment. An anomaly as referred to herein is an indication of an unusual amount of devices connected to a network that may be indicative of a network security breach or other undesirable unauthorized action taken across the network. Some embodiments disclosed herein describe the network as an edge network; however, use of this example is not intended to be limiting but is instead used for descriptive purposes only. Instead, the network can include elements of one or more of any type of network.

Illustrative embodiments include establishing a knowledge base based at least in part on network data received from a network. The knowledge base comprises network data representative of a plurality of entities in the network and relationships among the plurality of entities in the network. An entity as referred to herein is any network component, such as a device, that may be connected to and/or communicate with the other entities across the network. In an embodiment, the network data stored on the knowledge base includes device data and certificate data. In an embodiment, the knowledge base defines relationships between one or more devices and one or more digital certificates, such as for example, particular devices that may correspond to a particular digital certificate.

Illustrative embodiments include developing a network model that represents a relationship between a plurality of network devices and digital certificates corresponding to the plurality of network devices. Further, illustrative embodiments include developing a network model that represents a relationship between a plurality of network devices and digital certificates corresponding to the plurality of network devices over time.

Illustrative embodiments include sampling a network to receive a network data sample. In an embodiment, the network data sample may include network data corresponding to the network at a particular moment in time. In an embodiment, the network data may include device data and certificate data at a particular moment in time.

Illustrative embodiments include comparing the network data sample to the network model to determine whether an anomalous amount of devices is present in the network. In an embodiment, the network model estimates the growth or decay of the amount of devices across the network over time. In an embodiment, an anomalous amount of devices may include an amount of devices greater than an estimated amount of devices at a particular time, wherein the estimated amount of devices is determined based at least in part on historical data and device population growth rate. In an embodiment, an anomalous amount of devices may include an amount of devices less than an estimated amount of devices at a particular time, wherein the estimated amount of devices is determined based at least in part on historical data and device population growth rate. In an embodiment, determining whether an amount of devices corresponds to an anomalous amount of devices may include determining whether an amount of devices exceeds (or fails to meet) a predetermined threshold difference between the actual amount of devices and an expected amount of devices.

Illustrative embodiments include comparing the network data sample to the network model to determine whether an anomalous amount of digital certificates is present in the network. In an embodiment, deterring whether an anomalous amount of digital certificates is present in the network is performed upon a determination that an anomalous amount of devices is present in the network.

Illustrative embodiments include identifying a device population anomaly upon a determination that an anomalous amount of devices and/or an anomalous amount of certificates is present in the network. In an embodiment, a device population anomaly is detected upon comparing a relationship between an actual amount of devices and certificates to an expected relationship between an amount of devices and certificates. In an embodiment, detecting a device population anomaly may include a determination that a difference between expected relationship between devices and certificates and an actual relationship between devices and certificates exceeds (or fails to meet) a predetermined threshold difference.

Illustrative embodiments include executing a response action upon identification of a device population anomaly. In some embodiments, executing a response action may include, but is not limited to, generating an alert to notify an interested party regarding the unusual activity, notifying end-users or device owners about the detection of anomalous behavior, isolating one or more suspicious devices from the network, implementing network segmentation to isolate and contain the impact of the anomalous devices, implementing a temporary network lockdown to restrict communication, adjusting firewall rules to block or restrict traffic from the suspicious devices based on the detected anomalies, updating authentication protocols and/or access control policies to prevent unauthorized access, and various other response actions as described in greater detail herein.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as network monitor module 200 that monitors device population characteristics of a network and identifies an anomaly based on the device population characteristics observed. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
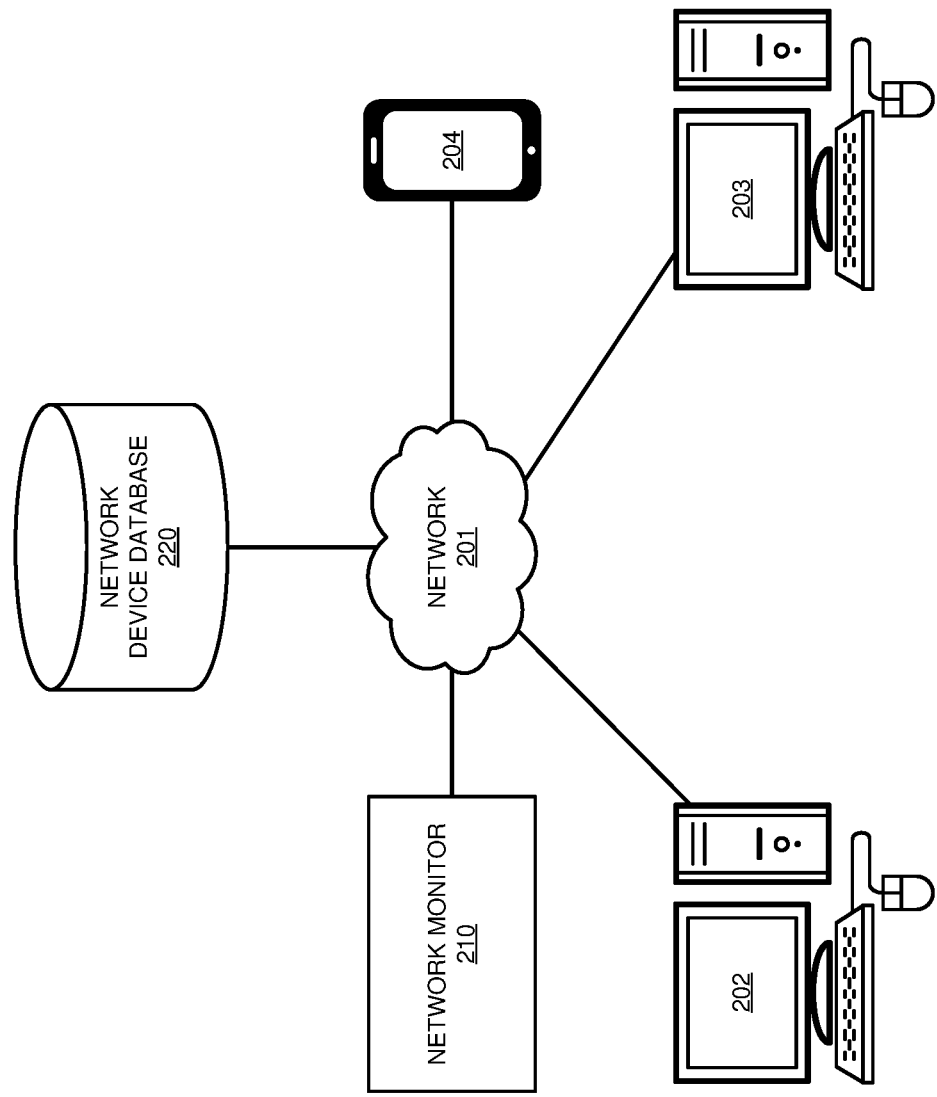
FIG. 2 depicts a block diagram of an example network environment in accordance with an illustrative embodiment.

With reference to FIG. 2, this figure depicts a block diagram of an example configuration of a network environment. In the illustrated embodiment, network monitor module 210 includes network monitor module 200 of FIG. 1.

In the illustrated embodiment, the network environment includes a network 201. In some embodiments, the network 201 includes an edge network, that comprises various connected network devices. In the illustrated embodiment, a first user device 203 and a second user device 204 is shown connected to network 201. The first user 203 device depicted may include, for example, a personal computer. The second user device 204 depicted may include, for example, a smartphone. Although example user devices are shown, the use of these particular example devices is not intended to be limiting, but rather is provided for the sake of clarity. Instead, the network 201 may include any number of any type of devices connected to network 201, including but not limited to, a computer, a smartphone, tablet, a personal digital assistant (PDA), a gaming console, an autonomous vehicle, a wearable device, an IoT device, etc. The exact amount and types devices connected via network 201 may be implementation specific and dependent on the exact configuration of network 201.

In the illustrated embodiment, the network monitor module 210 is configured to monitor network 201, as described in greater detail herein. In an embodiment, network monitor module 210 monitors network data corresponding to network 201, which may include, but is not limited to, network device data, and digital certificate data. In an embodiment, network device data may include, but is not limited to, a number of registered devices, a number of connected devices, a number of idle devices, a number of suspended devices, a number of deprovisioned devices, etc. In an embodiment, digital certificate data may include, but is not limited to, a number of validated certificates, a number of revoked certificates, a number of created certificates, a number of renewed certificates, etc.

In the illustrated embodiment, the network monitor module 210 is configured to monitor network 201 for anomalies. In an embodiment, network monitor module 210 is configured to create a network model representing network 201. In an embodiment, the network model created by network monitor module 210 represents a relationship between network devices of network 201 and digital certificates corresponding to the network devices. In an embodiment, the network model represents a relationship between network devices and digital certificates over a period of time. In an embodiment, the network model includes a layered model, such that each layer of the network model represents a specific point or snapshot in time. For example, suppose the layered model includes three specific points in time, the three corresponding layers may include a first layer denoted as frame K, a second layer denoted as frame K+1, and a third layer denoted as frame K+2. In an embodiment, the rate of growth or decay of a device population of devices connected to network 201 may be determined via network model based on historical network data.

In the illustrated embodiment, the administrator device 202 include a computing device configured to enable a user having sufficient privileges to perform various administrative tasks related to network monitor module 210. An example administrative task may include, but is not limited to, setting various parameters, settings, imitating network monitoring process, etc. In some embodiments, the administrative device 202 allows an administrative user to set a threshold error rate, such that upon exceeding the threshold error rate, an alert is generated and transmitted regarding detected device population anomaly.

In the illustrated embodiment, the network device database is a database configured to receive and store data related to network 201. In an embodiment, network device database 220 may store network data including, but not limited to, network device data, digital certificate data, etc. In an embodiment, the network monitor module 210 constructs a network model based at least in part on network data stored on network device database 220. In an embodiment, the network device database comprises a data sink that represents composite representational error corresponding to the network model generated by network monitoring module 210.

Figure 3:
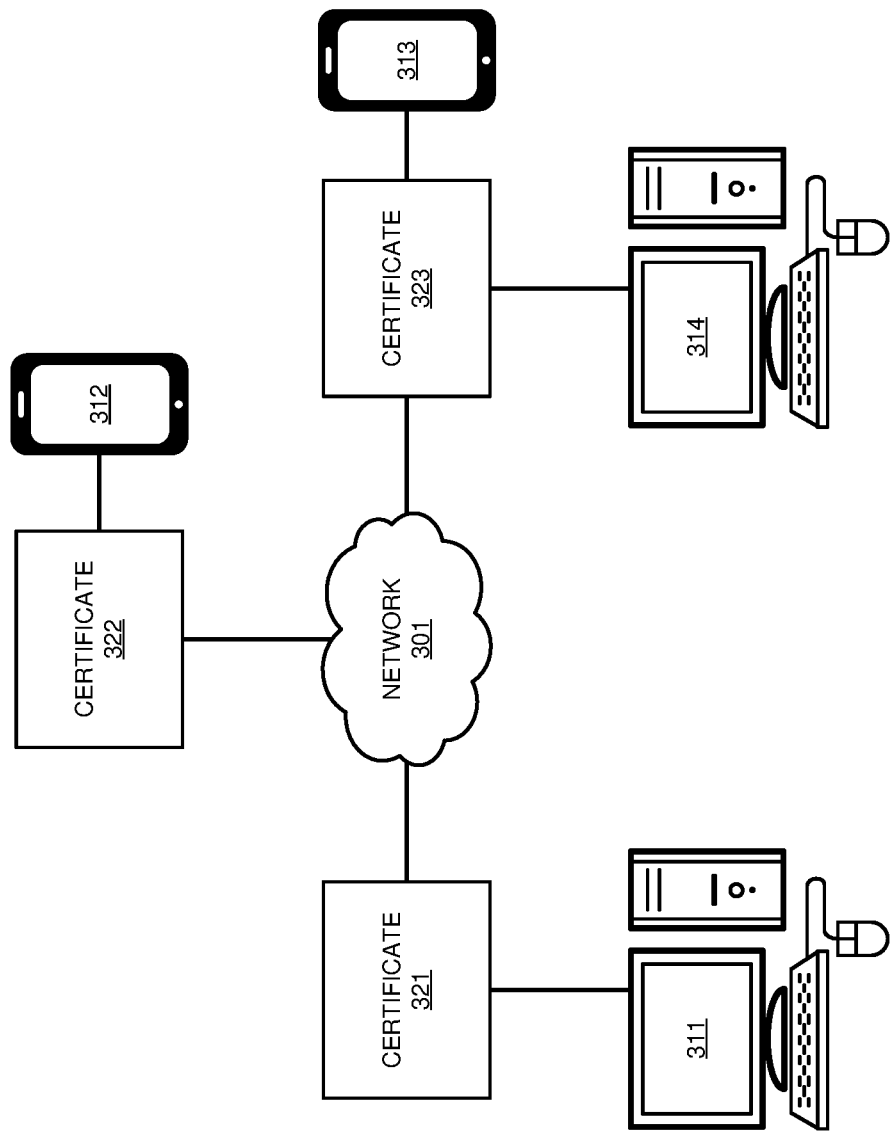
FIG. 3 depicts a block diagram of an example network environment in accordance with an illustrative embodiment.

With reference to FIG. 3, this figure depicts a block diagram of an example configuration of a network environment. In the illustrated embodiment, network 301 includes network 201 of FIG. 2.

In the illustrated embodiment, the network environment includes a plurality of network devices connected to network 301, including a first device 311, a second device 312, a third device 313, and a fourth device 314. In the illustrated embodiment, the first device 311 corresponds to a first digital certificate 321, the second device 312 corresponds to a second digital certificate 322, and the third device 313 and fourth device 314 both correspond to a third digital certificate 323. In the depicted scenario, a single digital certificate is shown corresponding to multiple devices. Depending on the implementation specific configuration of the network environment, the amount of digital certificates may differ from the amount of devices connected to the network. Embodiments disclosed herein consider the amount of devices connected to the network in relation to the amount of digital certificates. Further, embodiments disclosed herein consider the growth rate of device population in relation to the growth rate of digital certificates to determine whether the device population is anomalous based on historical data obtained from the network.

Figure 4:
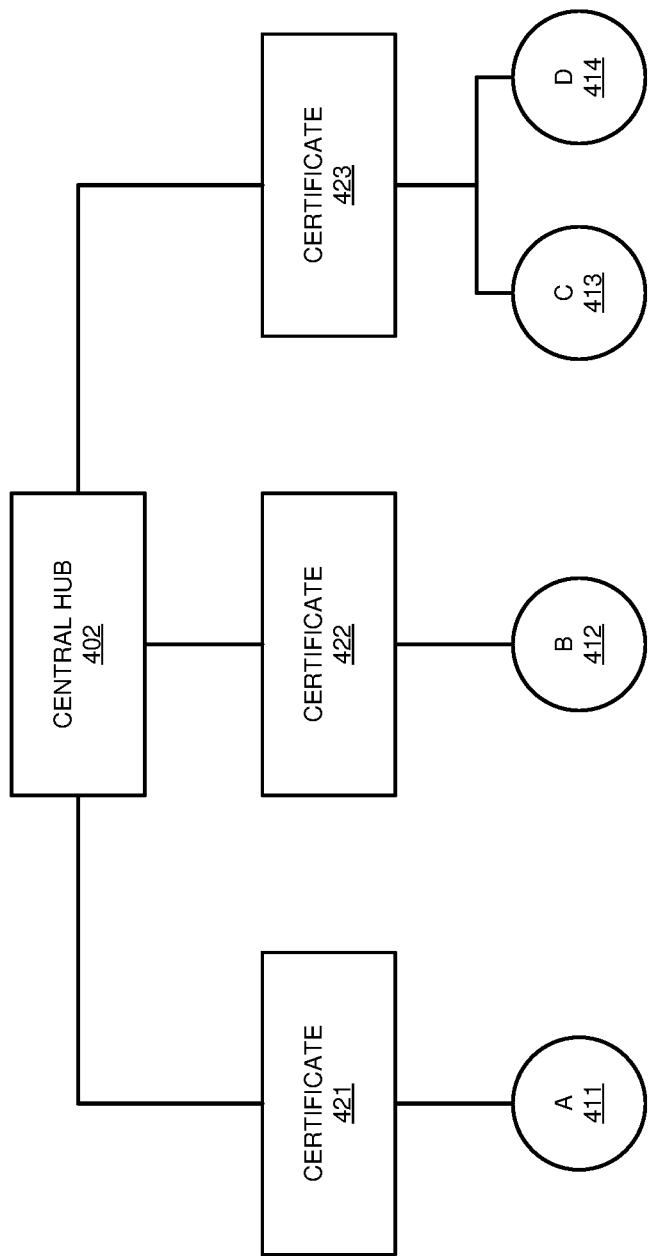
FIG. 4 depicts a block diagram of an example network environment in accordance with an illustrative embodiment.

With reference to FIG. 4, this figure depicts a block diagram of an example configuration of a network environment. In the illustrated embodiment, a central hub 402 is shown to which a first device 411, a second device, 412, a third device 413, and a fourth device 414 is connected. In the illustrated embodiment, the first device 411 corresponds to a first digital certificate 421, the second device 412 corresponds to a second digital certificate 422, and the third device 413 and fourth device 414 both correspond to a third digital certificate 423.

In the illustrated embodiment, the central hub 402 may comprise a certificate authority that manages digital certificates. Accordingly, the certificate authority may be responsible for issuing and authorizing digital certificates, such as for example, the first digital certificate 421, the second digital certificate 422, and the third digital certificate 423. In the depicted scenario, a single digital certificate is shown corresponding to multiple devices. Accordingly, it may be the case that a certificate authority of central hub 402 associates the same third digital certificate 423 to the third device 413 and the fourth device 414, based on implementation specific characteristics of the network configuration.

Figure 5:
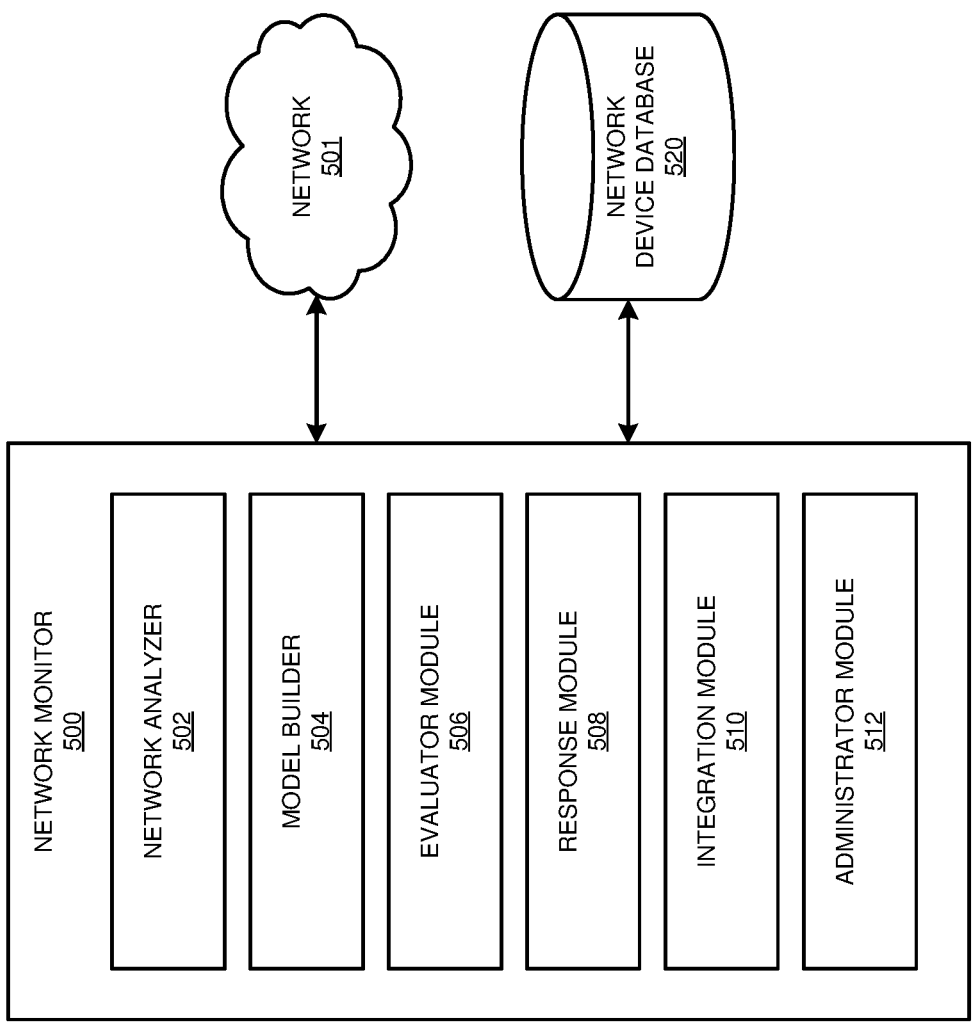
FIG. 5 depicts a block diagram of an example network monitor module in accordance with an illustrative embodiment.

With reference to FIG. 5, this figure depicts a block diagram of an example network monitor module 500. In an embodiment, network monitor module 500 includes network monitor module 200 of FIG. 1 and/or network monitor module 210 of FIG. 2. In an embodiment, network 501 includes network 201 of FIG. 2 and/or network 301 of FIG. 3. In an embodiment, network device database 520 includes network device database 220 of FIG. 2.

In the illustrated embodiment, the network monitor module 500 is a software module that includes a plurality of software modules. In the illustrated embodiment, the network monitor module 500 includes a network analyzer module 502, a model builder module 504, an evaluator module 506, a response module 508, an integration module 510, and an administrator module 512. In alternative embodiments, the network monitor module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the network analyzer module 502 is a software module configured to analyze and collect network data from network 501. In the illustrated embodiment, the network data analyzed and collect by network analyzer 502 may be stored on network device database 520. In an embodiment, network data collected by network analyzer module 502 may include, but is not limited to, device data, and certificate data.

In the illustrated embodiment, the model builder module 504 is a software module configured to construct a network model. In the illustrated embodiment, the network model represents network 501. In the illustrated embodiment, the model builder module 504 constructs the network model based on data collected by and received from network analyzer module 502. In an embodiment, the network model provides a composite representational error that has operational data and separate frequencies encoded, such that they can be decoded or decoupled at the receiver using different decoupling devices. In an embodiment, the model builder module 504 establishes a multi-layer model, such that each layer of the model represents a particular frame or snapshot of the network at a particular epoch.

In the illustrated embodiment, the evaluator module 506 is a software module configured to evaluate network data to identify an anomaly based on the network data. In an embodiment, the evaluator module 506 receives network data obtained via network analyzer module 502 and compares the network data to the network model constructed via model builder 504 to determine whether an anomaly exists. Accordingly, the network model may represent a relationship between network devices and digital certificates for those devices over time. In an embodiment, the network analyzer module 502 samples the network to obtain a current network data sample that characterizes a current relationship between an amount of network devices and an amount of digital certificates. Further, the evaluator module 506 compares the current sample to the network model to determine whether or not there is an anomalous amount of certificates or devices compared to the historical amount of each in relation to each other.

In the illustrated embodiment, the response module 508 is a software module configured to actuate a response action upon identification of an anomaly. In some embodiments, an example response action that may be actuated may include, but is not limited to, generating an alert to notify an interested party regarding the unusual activity, notifying end-users or device owners about the detection of anomalous behavior, isolating one or more suspicious devices from the network, implementing network segmentation to isolate and contain the impact of the anomalous devices, implementing a temporary network lockdown to restrict communication, adjusting firewall rules to block or restrict traffic from the suspicious devices based on the detected anomalies, updating authentication protocols and/or access control policies to prevent unauthorized access, and various other response actions as described in greater detail herein.

In the illustrated embodiment, the integration module 510 is a software module configured to enable the network monitor module 500 to integrate with a network, a computing device, a software application, and/or various other components. In an embodiment, the integration module 510 is configured to integrate the network monitor module 500 with a network to enable the network monitor module 500 to analyze and collect data from the network. In an embodiment, the integration module 510 is configured to integrate with a computing device connected to a network to analyze and collect data related to the device. In an embodiment, the integration module 510 is configured to integrate with a security information and event management (SIEM) software.

In the illustrated embodiment, the administrator module 512 is a software module configured to enable a user having sufficient privileges to perform various administrative actions associated with network monitor module 500. An example administrative action may include, but is not limited to, setting various parameters, settings, imitating a network monitoring process, etc. In some embodiments, the administrator module 512 allows an administrative user to set a threshold error rate, such that upon exceeding the threshold error rate, an alert is generated and transmitted regarding detected device population anomaly. In some embodiments, the administrator module 512 allows an administrative user to configure one or more automatic response actions that may be executed upon detection of an anomaly and/or upon exceeding of the threshold error rate.

With reference to FIG. 6, this figure depicts example formulas related to device population anomaly detection in accordance with an illustrative embodiment. In the illustrated embodiment, the first formula 601 represents a network model. In an example configuration, the network model provides a composite representational error that has operational data and separate frequencies encoded, such that they can be decoded or decoupled at the receiver using different decoupling devices. In an embodiment, the receiver and decoupled devices are entities emancipated within the network. These decoupling devices may represent specific operational data in the form of time series data of a given metric. In an embodiment, the metric includes device data, such as for example, device population data. In such a scenario, the corresponding time series data that is received provides insight into how the device population has progressed, evolved, or degenerated within the network, which may be represented by $E[Pi(k)]$ devices. Accordingly, in formula 601, the network model is defined by $\partial A(k)$, which is available for the common error data sink at the K frame of distribution. Further, the common error data sink may comprise multiple metrics that may be indexed by $j=B \ldots N$.

In the illustrated embodiment, the second formula 602 represents a formula for evaluating composite representational error. Accordingly, in formula 602, composite representational error is represented as $e\xi$ which is retrieved from a common error data sink, $\partial A(k)\partial$ which has multiple metrics being indexed by $j=B \ldots N$. In an embodiment, if the value of $e\xi$ is zero or below a predetermined threshold, then no representational error exists. Otherwise, if $e\xi$ is greater than zero or exceeds a predetermined threshold, then the error may be further investigated to determine whether an anomalous amount of devices exist on the network.

In the illustrated embodiment, the third formula 603 represents a formula for evaluating representational error or an anomaly that is sensitive to the number of devices that has changed over a given epoch. Accordingly, in formula 603, $\xi$ device represents the representational error or an anomaly that is sensitive to the number of devices that has changed over a given time epoch. As this sensitivity is manifested because of an array of Kalman filters being considered in the design, J=2 is specific to the Kalman filter which is processing the sensitivity towards the devices second in the array.

In the illustrated embodiment, the fourth formula 604 represents a formula for evaluating a hypothesis based on the queried device population data in relation to the queried certificate data. Accordingly, in formula 604, $\theta$ certificates represents the time series for certificates issued within the network model. Further, H1 represents the hypothesis that the change in the number of devices and the change in the corresponding number of certificates being issued by the certificate issuing authorities within the network model are not convolved in regular dimension. Accordingly, if H1 is determined to be true then that indicates that a device population is Byzantine or anomalous.

Figure 7:
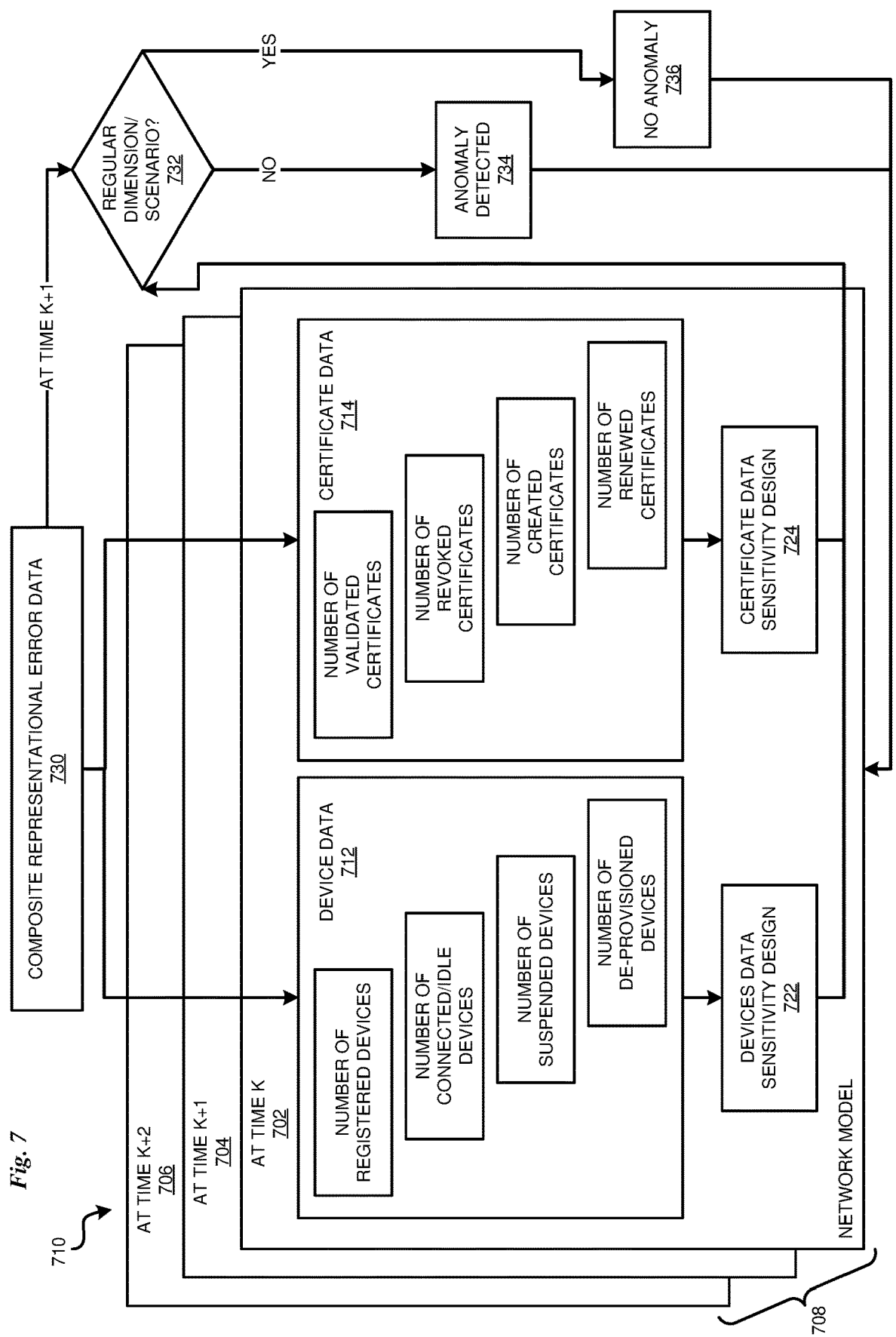
FIG. 7 depicts a block diagram of an example network model in accordance with an illustrative embodiment.

With reference to FIG. 7, this figure depicts a block diagram of an example model for identifying a network anomaly, in accordance with an illustrative embodiment. In the illustrated embodiment, the network model 710 may include aspects of the network monitor module 200 of FIG. 1, network monitor module 210 of FIG. 2, and/or network monitor module 500 of FIG. 5.

In the illustrated embodiment, the network model 710 is depicted including a plurality of layers 708, such that each layer of the plurality of layers 708 represents a snapshot of a network at particular epoch or a certain point in time. In the illustrated embodiment, the plurality of layers 708 of the network model 710 includes a first layer 702, a second layer 704, and a third layer 706. Although 3 layers are shown for sake of clarity and simplicity, it is contemplated herein that the network model may include any number of layers, depending on the amount of snapshots taken of the network, and/or the frequency of recording snapshots of the network. In the illustrated embodiment, the first layer 702 represents a snapshot of the network at frame K, the second layer 704 represents a snapshot of the network at frame K+1, and the third layer 706 represents a snapshot of the network at frame K+2. In the illustrated embodiment, "K" represents an epoch, such that the first layer 702 corresponds to a first epoch, the second layer 704 corresponds to a second epoch, the third layer 706 corresponds to a third epoch, etc. In the illustrated embodiment, the network model 710 represents a steady-state model of a network.

In the illustrated embodiment, each layer of network model 710 includes device data 712 and certificate data 714 that collectively form composite representational error data stored on data sink 730. In the illustrated embodiment, device data 712 may include, but is not limited to, a number of registered devices, a number of connected devices, a number of idle devices, a number of suspended devices, a number of de-provisioned devices, and/or any other data related to characteristics to a device population of a network. In the illustrated embodiment, certificate data 714 may include, but is not limited to, a number of validated certificates, a number of revoked certificates, a number of created certificates, a number of renewed certificates, and/or any other data related to digital certificates corresponding to devices connected to the network. Further, the network model 710 includes a configurable sensitivity metric 722 based on device data 712, as well as a configurable sensitivity metric 724 based on certificate data 714.

In the illustrated embodiment, at block 732, the network model evaluates whether the composite representational data 730 is representative of a regular dimension or scenario. Accordingly, if the representational data 730 is not representative of a regular dimension or scenario, the network model 710 detects an anomaly at block 734. Otherwise, if the representational data 730 is representative of a regular dimension or scenario, the network model 710 does not detect an anomaly at block 736.

Figure 8:
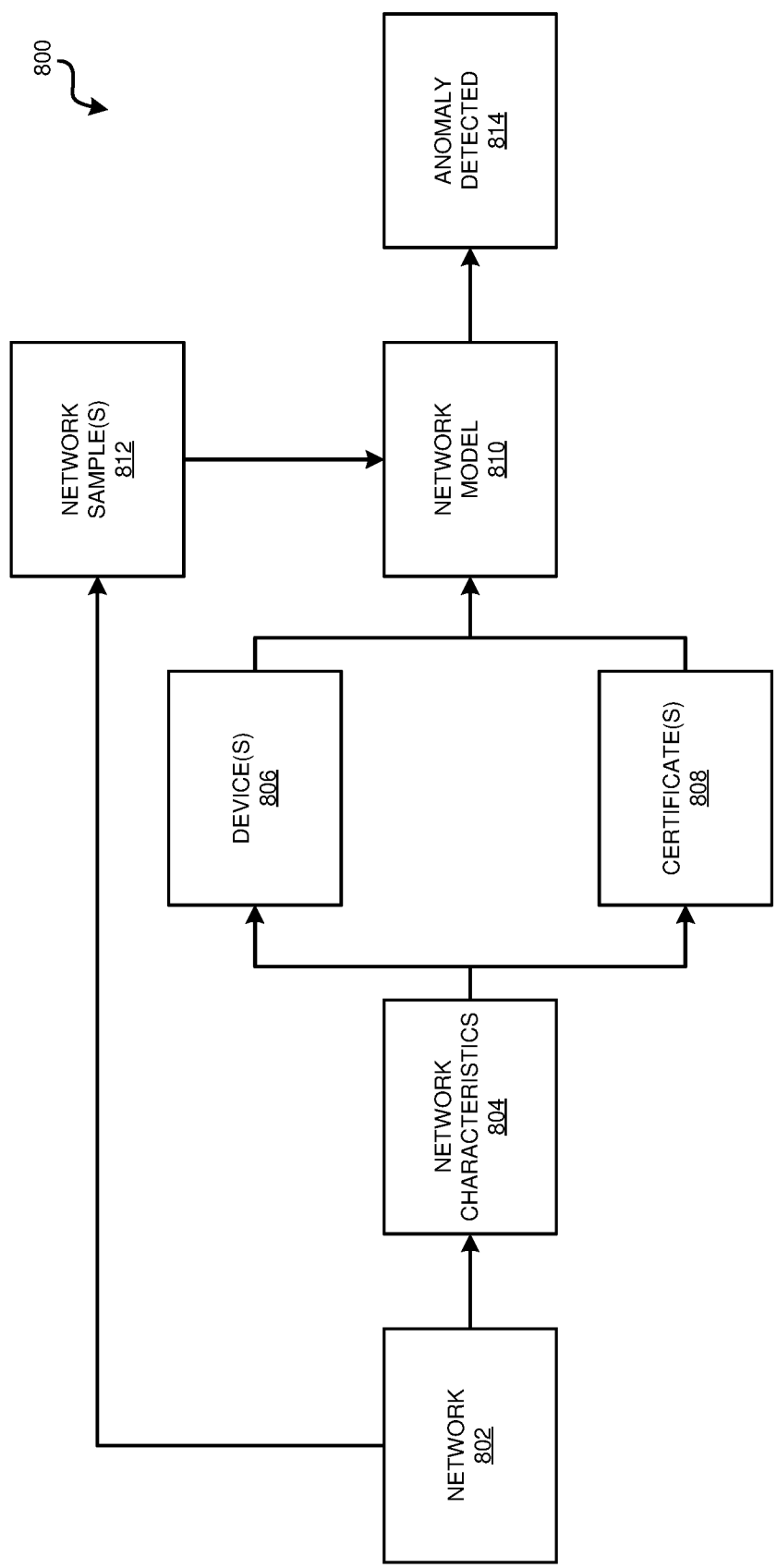
FIG. 8 depicts a block diagram of an example monitoring process in accordance with an illustrative embodiment.

With reference to FIG. 8, this figure depicts a block diagram of an example process for device population anomaly detection in accordance with an illustrative embodiment. In a particular embodiment, network model 810 includes network model 710 of FIG. 7.

In the illustrated embodiment, process 800 includes establishing a network model 810 based on a network 802. Accordingly, the process 800 may include collecting network data 804 from network 802, such that network data 802 comprises network data that is characteristic of the network 802, that may include, but is not limited to, an amount of devices 806 connected to network 802, and an amount of certificates 808 that correspond to the devices, and may use that data to establish network model 810 that represents a relationship between network devices and digital certificates for those devices over time. In an embodiment, the network model 810 includes a layered model comprising snapshots of the characteristics of network 802 at particular epochs, such that each epoch is represented as a frame or layer in the network model 810. Accordingly, the first layer may represent a K frame, the second layer may represent a K+1 frame, the third layer represents a K+2 frame, and so forth. This configuration of the model enables the model to provide a historical understanding of how the number of devices are increasing and how the number of certificates are increasing in the network, and the relation between the growth or decay of each to each other In the illustrated embodiment, the network model 810 may include an error sink component that provides a comprehensive historical view of multitude of errors. In an embodiment, the error sink retrieves data from various logs, and compiles the log data in a central location from which the data may be readily retrieved. Embodiments of the disclosed process includes querying error data sink for composite representational error. In an embodiment, the error sink comprises a composite representational error data that may comprise a multidimensional lattice of errors. In an embodiment, the error sink may be queried in order to retrieve values related to device count and/or certificate count, and those values may be utilized to determine whether there is any kind of discrepancy between the device count and the certificate count. Accordingly, if there is a discrepancy, then an anomaly is detected. Otherwise, if there is no discrepancy, then no anomaly is detected.

Further, in the illustrated embodiment, process 800 includes sampling network 802 to collect a network data sample 812. Accordingly, sampling the network provides insight into the current relationship between an amount of network devices and an amount of digital certificates. Further, embodiments of the disclosed process 800 include comparing the current sample to the network model 810 to determine whether or not there is an anomalous amount of certificates or devices compared to the historical amount of each. In an embodiment, the process 800 includes determining whether a device population growth rate is out of sync with a certificate population growth rate, and upon a determination that the device growth rate is out of sync with the certificate population growth rate, proceeds to block 814 to detect an anomaly.

Figure 9:
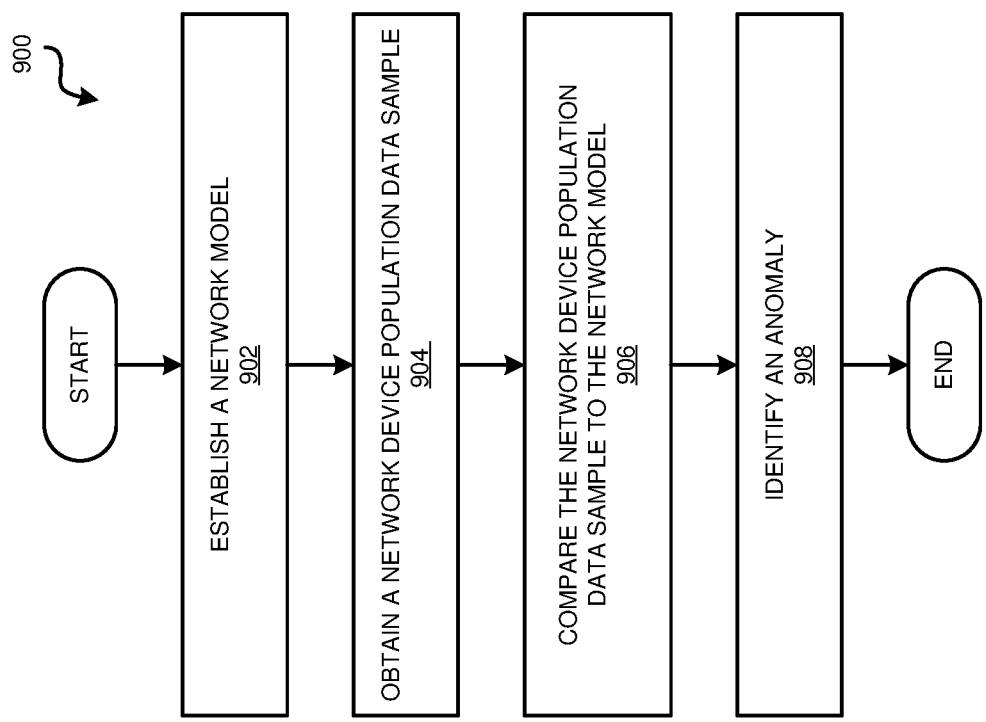
FIG. 9 depicts a flowchart of an example process for automated detection of network device population anomalies in accordance with an illustrative embodiment.

With reference to FIG. 9, this figure depicts a flowchart of an example process for device population anomaly detection in accordance with an illustrative embodiment. In a particular embodiment, the network monitor module 200 of FIG. 1, network monitor module 210 of FIG. 2, network monitor module 500 of FIG. 5, network model 710 of FIG. 7, and/or network model 810 of FIG. 8 carries out the process 900.

At step 902, the process establishes a network model representative of a network of connected devices. In an embodiment, the network model represents a relationship between a number of devices of a network, and a number of digital certificates corresponding to the devices, over a period of time. Further, in an embodiment, the network model determines the expected growth of the device population of the network over time, as well as the growth of the number of digital certificates corresponding to devices of the network over time.

At step 904, the process obtains a network population device data sample of the network. In an embodiment, the process obtains a network population device data sample of the network at a current moment in time. In an embodiment, the network population device data sample includes device data and certificate data corresponding to the network at the current moment in time.

At step 906, the process compares the network population device data sample to the network model to evaluate whether the network population device data of the network population device data sample represents an expected dimensionality and/or represents an expected scenario. For example, suppose the network population device data sample includes a particular amount of devices, then the network population device data sample should also include a particular amount of digital certificates based on the particular amount of devices. In an embodiment, the process first determines whether the amount of devices currently connected to the network is anomalous, based on whether the amount of devices aligns with the device population growth rate determined by the model and the particular moment in time that the network is sampled. In such embodiment, if the process determines that the current amount of devices is anomalous (e.g., exceeds the amount of expected devices), then the process continues to determine whether the amount of digital certificates is also anomalous.

At step 908, the process identifies an anomaly in the device population data based at least in part on the results of the comparison between the network device population sample and the network model. In some embodiments, the process executes a responsive action upon identification of a device population anomaly. When an anomaly is detected, the process may perform various automatic responses to mitigate potential security risks and maintain network integrity. In an embodiment, the process includes generating an alert to notify an interested party regarding the unusual activity. In some embodiments, the alert may include a text communication, such as for example, a text message, an email, or any other text-based communication. In an embodiment, the process includes triggering an automated incident response workflow to coordinate various security processes, such as alerting, investigation, and remediation. In an embodiment, the process includes integrating with security information and event management (SIEM) solutions to correlate anomalous network device behavior with other security events and gain a holistic view of potential threats. In an embodiment, the process includes notifying end-users or device owners about the detection of anomalous behavior, instructing them on security best practices or actions to take.

In an embodiment, the process includes isolating one or more suspicious devices from the network to prevent further communication and potential spread of threats. In an embodiment, the process includes implementing network segmentation to isolate and contain the impact of the anomalous devices and limit said anomalous devices from moving laterally within the network. In an embodiment, the process includes prioritizing and deploy necessary patches or updates to address vulnerabilities that may have been exploited by the anomalous devices. In an embodiment, the process includes implementing a temporary network lockdown to restrict all non-essential communication while the security team investigates the incident. In an embodiment, the process includes adjusting firewall rules to block or restrict traffic from the suspicious devices based on the detected anomalies. In an embodiment, the process includes updating authentication protocols and/or access control policies to prevent unauthorized access.

In an embodiment, the process includes analyzing the network traffic patterns and behavior of the detected devices to determine if they exhibit characteristics of malicious activity. In an embodiment, the process includes performing a deep packet inspection on the network traffic associated with the detected devices to identify malicious patterns or activities. In an embodiment, the process includes inspecting and blocking malicious traffic, preventing potential attacks from reaching selected components and/or systems of the network. In an embodiment, the process includes using a device fingerprinting technique to identify the type of device and its normal behavior, to distinguish between a legitimate and unauthorized device. In an embodiment, the process includes automatically initiating the collection of forensic data related to the detected devices for later analysis and investigation.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
establishing a network model based at least in part on network data received from a network, wherein the network data comprises device data and certificate data;
sampling the network to receive a network data sample;
comparing the network data sample to the network model to determine whether an anomalous amount of devices is present in the network;
upon a determination that an anomalous amount of devices is present in the network, comparing the network data sample to the network model to determine whether an anomalous amount of certificates is present in the network; and
upon a determination that an anomalous amount of certificates is present in the network, identifying a device population anomaly.

2. The computer-implemented method of claim 1, wherein the method further comprises executing a responsive action upon identification of the device population anomaly.

3. The computer-implemented method of claim 1, wherein the device data comprises at least one of a number of registered devices, a number of connected devices, a number of idle devices, a number of suspended devices, and a number of deprovisioned devices.

4. The computer-implemented method of claim 1, wherein the certificate data comprises at least one of a number of validated certificates, a number of revoked certificates, a number of created certificates, and a number of renewed certificates.

5. The computer-implemented method of claim 2, wherein the responsive action comprises generating and transmitting an alert related to the identification of the device population anomaly.

6. The computer-implemented method of claim 2, wherein the responsive action comprises identifying a set of suspicious devices connected to the network and removing the set of suspicious devices from the network.

7. The computer-implemented method of claim 2, wherein the responsive action comprises isolating a segment of the network.

8. A computer program product comprising one or more computer readable storage media, and program instructions collectively stored on the one or more computer readable storage media, the program instructions executable by a processor to cause the processor to perform operations comprising:

establishing a network model based at least in part on network data received from a network, wherein the network data comprises device data and certificate data;
sampling the network to receive a network data sample;
comparing the network data sample to the network model to determine whether an anomalous amount of devices is present in the network;
upon a determination that an anomalous amount of devices is present in the network, comparing the network data sample to the network model to determine whether an anomalous amount of certificates is present in the network; and
upon a determination that an anomalous amount of certificates is present in the network, identifying a device population anomaly.

9. The computer program product of claim 8, wherein the program instructions are stored in a computer readable storage device in a data processing system, and wherein the program instructions are transferred over the network from a remote data processing system.

10. The computer program product of claim 8, wherein the program instructions are stored in a computer readable storage device in a server data processing system, and wherein the program instructions are downloaded in response to a request over the network to a remote data processing system for use in a computer readable storage device associated with the remote data processing system, the operations further comprising:
metering a use of the program instructions associated with the request; and
generating an invoice based on the metered use.

11. The computer program product of claim 8 further comprises executing a responsive action upon identification of the device population anomaly.

12. The computer program product of claim 11, wherein the responsive action comprises generating and transmitting an alert related to the identification of the device population anomaly.

13. The computer program product of claim 11, wherein the responsive action comprises identifying a set of suspicious devices connected to the network and removing the set of suspicious devices from the network.

14. The computer program product of claim 11, wherein the responsive action comprises isolating a segment of the network.

15. The computer program product of claim 8, wherein the certificate data comprises at least one of a number of validated certificates, a number of revoked certificates, a number of created certificates, and a number of renewed certificates.

16. The computer program product of claim 8, wherein the device data comprises at least one of a number of registered devices, a number of connected devices, a number of idle devices, a number of suspended devices, and a number of deprovisioned devices.

17. A computer system comprising a processor and one or more computer readable storage media, and program instructions collectively stored on the one or more computer readable storage media, the program instructions executable by the processor to cause the processor to perform operations comprising:
establishing a network model based at least in part on network data received from a network, wherein the network data comprises device data and certificate data;
sampling the network to receive a network data sample;

comparing the network data sample to the network model to determine whether an anomalous amount of devices is present in the network;

upon a determination that an anomalous amount of devices is present in the network, comparing the network data sample to the network model to determine whether an anomalous amount of certificates is present in the network; and upon a determination that an anomalous amount of certificates is present in the network, identifying a device population anomaly.

18. The computer system of claim 17, further comprises executing a responsive action upon identification of the device population anomaly.

19. The computer system of claim 18, wherein the responsive action comprises isolating a segment of the network.

20. The computer system of claim 18, wherein the responsive action comprises identifying a set of suspicious devices connected to the network and removing the set of suspicious devices from the network.

* * * * *